(12) United States Patent
McCormick et al.

(10) Patent No.: US 6,830,516 B2
(45) Date of Patent: Dec. 14, 2004

(54) BALL HUB APPARATUS AND METHOD FOR USE IN A UNIVERSAL JOINT

(75) Inventors: Christopher E. McCormick, Torrington, CT (US); Nicholas T. Fappiano, Watertown, CT (US)

(73) Assignee: The Torrington Company, Torrington, CT (US)

( * ) Notice: Subject to any disclaimer, the term of this patent is extended or adjusted under 35 U.S.C. 154(b) by 0 days.

(21) Appl. No.: 10/404,639

(22) Filed: Apr. 1, 2003

(65) Prior Publication Data

US 2004/0198500 A1 Oct. 7, 2004

(51) Int. Cl.$^7$ ................................. F16D 3/38
(52) U.S. Cl. ............... 464/136; 464/132; 29/898.07
(58) Field of Search ................. 464/136, 132, 464/905; 403/57, 74; D15/199, 148; D21/499, 498; 29/898.07, 428

(56) References Cited

U.S. PATENT DOCUMENTS

| | | | |
|---|---|---|---|
| 1,121,144 A | * | 12/1914 | Sponsel ................ 464/134 |
| 2,153,415 A | * | 4/1939 | Fett et al. ............. 464/136 |
| 4,365,488 A | * | 12/1982 | Mochida et al. ........ 464/132 |
| 4,384,861 A | | 5/1983 | Lange et al. |
| 4,636,180 A | | 1/1987 | Runkle |
| 5,326,322 A | * | 7/1994 | Fechter ................ 464/11 |
| 5,358,445 A | | 10/1994 | Wuebker |
| 5,423,722 A | | 6/1995 | Beauch et al. |
| 5,704,641 A | | 1/1998 | Shimizu et al. |
| 6,019,391 A | | 2/2000 | Stuedemann et al. |
| 6,099,036 A | | 8/2000 | Fujiu et al. |
| 6,148,687 A | | 11/2000 | Kurita |
| 6,293,167 B1 | | 9/2001 | Latz et al. |
| 6,435,555 B1 | | 8/2002 | Seamon et al. |

* cited by examiner

*Primary Examiner*—David Bagnell
*Assistant Examiner*—K. Thompson
(74) *Attorney, Agent, or Firm*—Michael Best & Friedrich LLP

(57) ABSTRACT

A universal joint hub comprising a generally spherical body having two flat areas on opposing exterior sides and at least one opening into an open body interior. The hub has two flat areas on opposing interior surfaces of the body orthogonal to the exterior flat areas and an exterior circumferential groove extending between the exterior flat areas on a given plane. Four apertures extend into the body and are positioned orthogonal to each other on the given plane with each aperture disposed in one of the flat areas. A bushing is disposed in each aperture having a face exposed to the exterior surface. A circumferential band is disposed in the circumferential groove coupling each of the bushings.

13 Claims, 7 Drawing Sheets

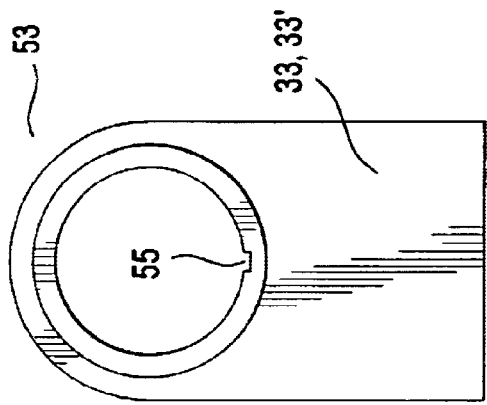
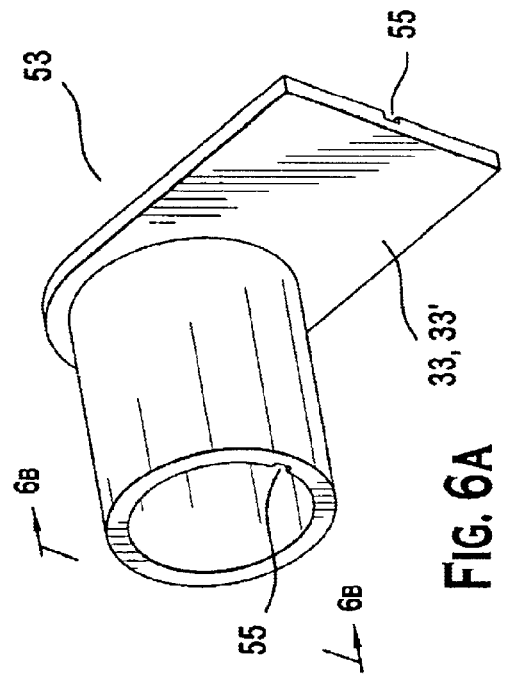
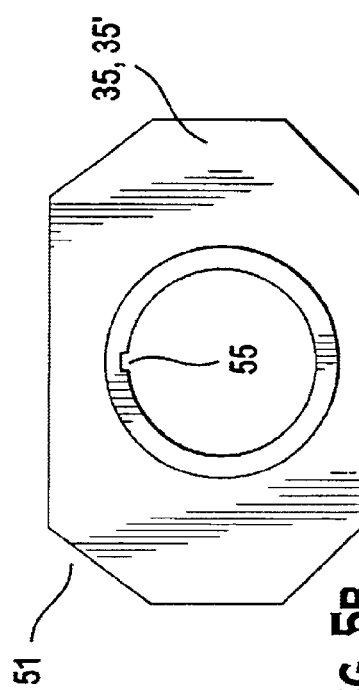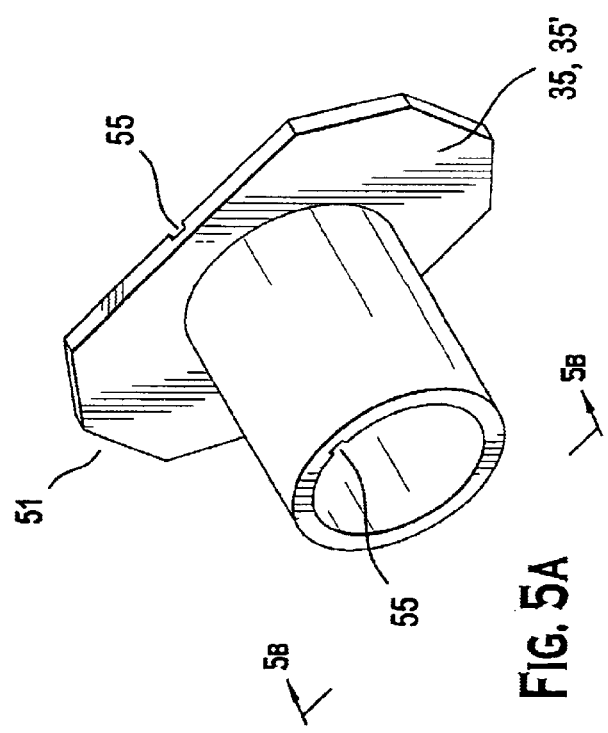
FIG. 6B
FIG. 6A
FIG. 5B
FIG. 5A

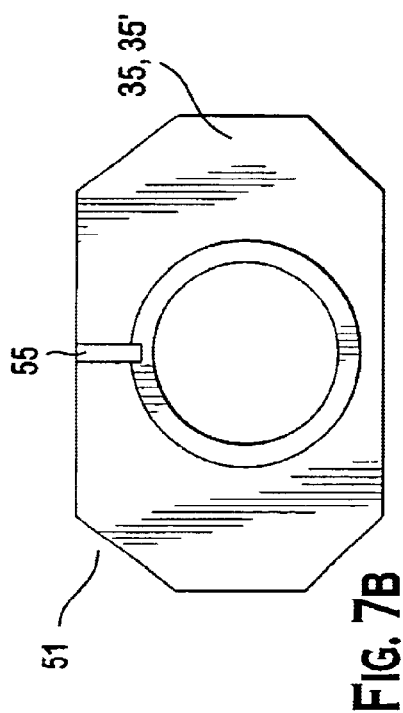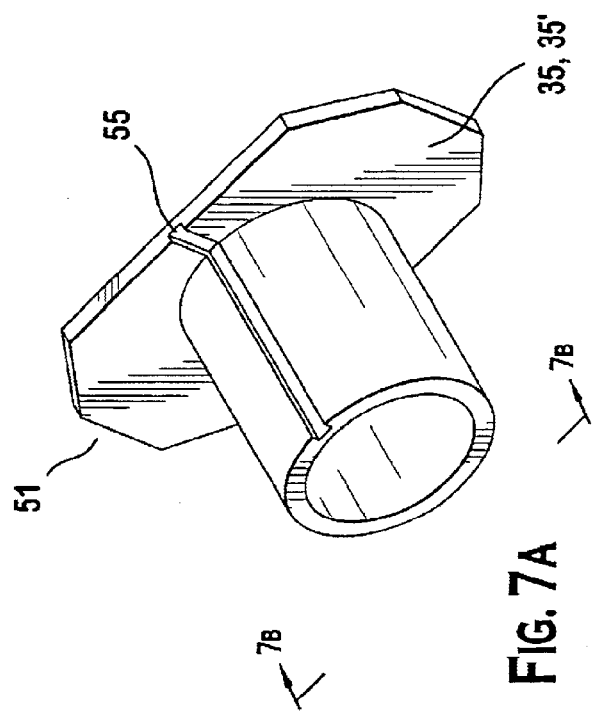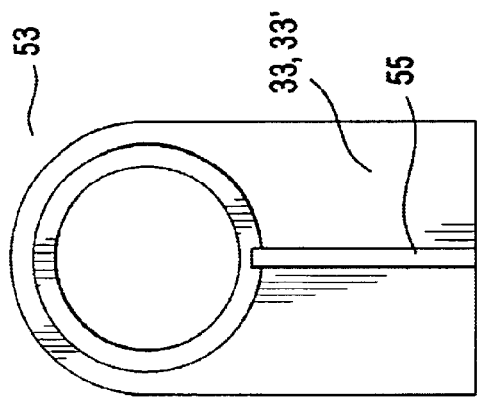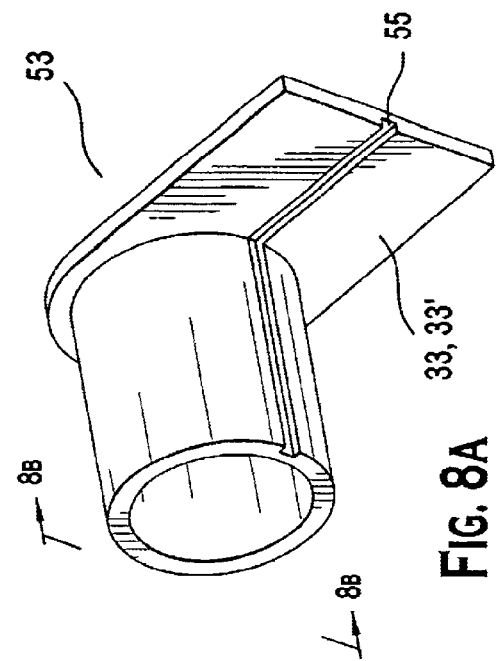

BALL HUB APPARATUS AND METHOD FOR USE IN A UNIVERSAL JOINT

BACKGROUND

The invention relates generally to universal joints. More specifically, embodiments of the invention relate to ball hubs for use in universal joints and methods of manufacture.

In today's vehicles, the steering system generally includes a common shaft, supported by a steering column, coupling a steering wheel to a steering gear assembly for transmitting directional rotation from a user to a steering geometry to provide directional control. The shaft typically passes through a vehicle firewall that separates passenger and engine compartments. To provide for various vehicle steering column designs, safety considerations and user comforts, the shaft has to navigate a complicated route necessitating two or more joints that connect the rotating shafts allowing for freedom of rotation regardless of the different angles the steering shaft experiences.

A Cardan, or yoke type universal joint, is frequently used to accomplish the transitions between steering shaft angles. This type of universal joint is common in the industry and includes two yokes and a cross shaft. Bearing surfaces couple the cross shaft to the yokes, allowing for a predetermined freedom of movement in two planes.

Gaining in popularity is the ball hub universal joint, shown in FIGS. 1 and 2, that provides for a reduction in weight, size, and NVH (Noise, Vibration and Harshness). This type of universal joint includes a first shaft 17 having at one end a ball hub 19, that is usually attached with a long pin 21 allowing for a first axis of pivotal motion. The long pin 21 passes through one side of the ball hub 19 along an equator, through the first shaft 17, and back into the ball 19. The ball 19 is received in a cup 23 that is rigidly attached to a second shaft 25. The ball hub 19 is retained in the cup 23 using two short pins 27, 27' that allow for a second axis of pivotal motion orthogonal to the first axis. Each short pin 27, 27' passes through the outside of the cup 23 and into the ball 19 along the equator.

For most passenger car and light truck applications, the ball hub and cup can be made from self-lubricating plastics such as Teflon®, Delrin®, or others, thereby obviating the need for low friction bearing surfaces between the moving parts (pins, ball and cup). However, for applications that are subjected to severe driving conditions which result in high dynamic torque loads, metal offers greater robustness and durability than most self-lubricating plastics. The metal parts need low friction load bearing surfaces.

To minimize friction and NVH in both axis of rotation, bushings are placed into the ball hub 19 pin holes where the long pin 21 and short pins 27, 27' couple the first shaft 17 to the ball hub 19 and to the cup 23 as shown in FIG. 3. The bushings are typically made of a self-lubricating material. Each bushing has an associated flange surface to minimize friction between surfaces of the first shaft 17 and ball hub 19, and the ball hub 19 and cup 23. The long pin 21 bushings 29, 29' locate their flange surfaces 33, 33' on the interior of the ball hub 19, the short pin 27, 27' bushings 31, 31' locate their flange surfaces 35, 35' on the exterior of the ball hub 19.

While bushing inserts solve one problem, they create a problem of their own. Depending on the design specification, the allowable rotational lash or play between the first and second shafts may be specified at a minimum. Precise, low clearance fits would therefore be required between the long 21 and short 27, 27' pins and ball hub 19 to meet the lash specification of the steering shaft. Since a bushing is a removable cylindrical guide, where one low clearance fit existed between the pin and mating surface, another low clearance fit between the bushing and mating surface is created. The clearance between the three components increases rotational lash above design specifications. Further, the bushings can rotate when the joint is being exercised causing binding of the joint. This in turn increases the torque necessary to rotate the shaft while concomitantly decreasing the joint articulation.

The prior art has addressed this shortcoming by decreasing the internal diameter of the bushings such that the insertion of the pins causes the bushings to expand, reducing the clearance fit between the long 21 and short 27, 27' pins, bushings 29, 29', 31, 31' and ball hub 19. However, during assembly, insertion of the pins can shave the inner diameter of the bushings resulting in unacceptable lash. Additionally, the bushings would not expand sufficiently to reduce clearance between the bushing and ball hub to achieve an acceptable lash.

SUMMARY

The inventors have discovered that it would be desirable to have a low lash ball hub for use in a universal joint and methods for manufacturing, for applications such as steering column shafts that experience a high torque load. One aspect of the invention provides a universal joint hub comprising a generally spherical body having two flat areas on opposing exterior sides and at least one opening into an open body interior. The hub has two flat areas on opposing interior surfaces of the body orthogonal to the exterior flat areas and an exterior circumferential groove extending between the exterior flat areas on a given plane. Four apertures extend into the body and are positioned orthogonal to each other on the given plane with each aperture disposed in one of the flat areas. A bushing is disposed in each aperture having a face exposed to the exterior surface. A circumferential band is disposed in the circumferential groove coupling each of the bushings.

The method begins with forming a generally spherical body having two flat areas on opposing exterior sides and at least one opening into an open body interior. Forming two flat areas on opposing interior surfaces of the body, the interior flat areas orthogonal to the exterior flat areas. Forming an exterior circumferential groove extending between the exterior flat areas on a given plane and creating four apertures extending into the body and positioned orthogonal to each other on the given plane with each aperture disposed in one of the flat areas. Disposing a bushing in each of the apertures, each bushing having a face exposed to the exterior surface and disposing a circumferential band in the circumferential groove thereby coupling each of the bushings.

Other objects and advantages of the method will become apparent to those skilled in the art after reading the detailed description of the preferred embodiment.

BRIEF DESCRIPTION OF THE DRAWINGS

FIGS. 5a and 5b are exemplary views of a long pin bushing.

FIGS. 6a and 6b are exemplary views of a short pin bushing.

FIGS. 7a and 7b are exemplary views of an alternative long pin bushing.

FIGS. 8a and 8b are exemplary views of an alternative short pin bushing.

DETAILED DESCRIPTION OF THE PREFERRED EMBODIMENTS

Embodiments of the invention will be described with reference to the accompanying drawing figures wherein like numbers represent like elements throughout. The invention is taught for use in articulating a steering column shaft as an application. However, the invention is not limited by this example and can be applied to other applications requiring a hub for a universal joint. While the description refers to a "ball" hub, the term should not be regarded as limiting. Further, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

Figure 1:
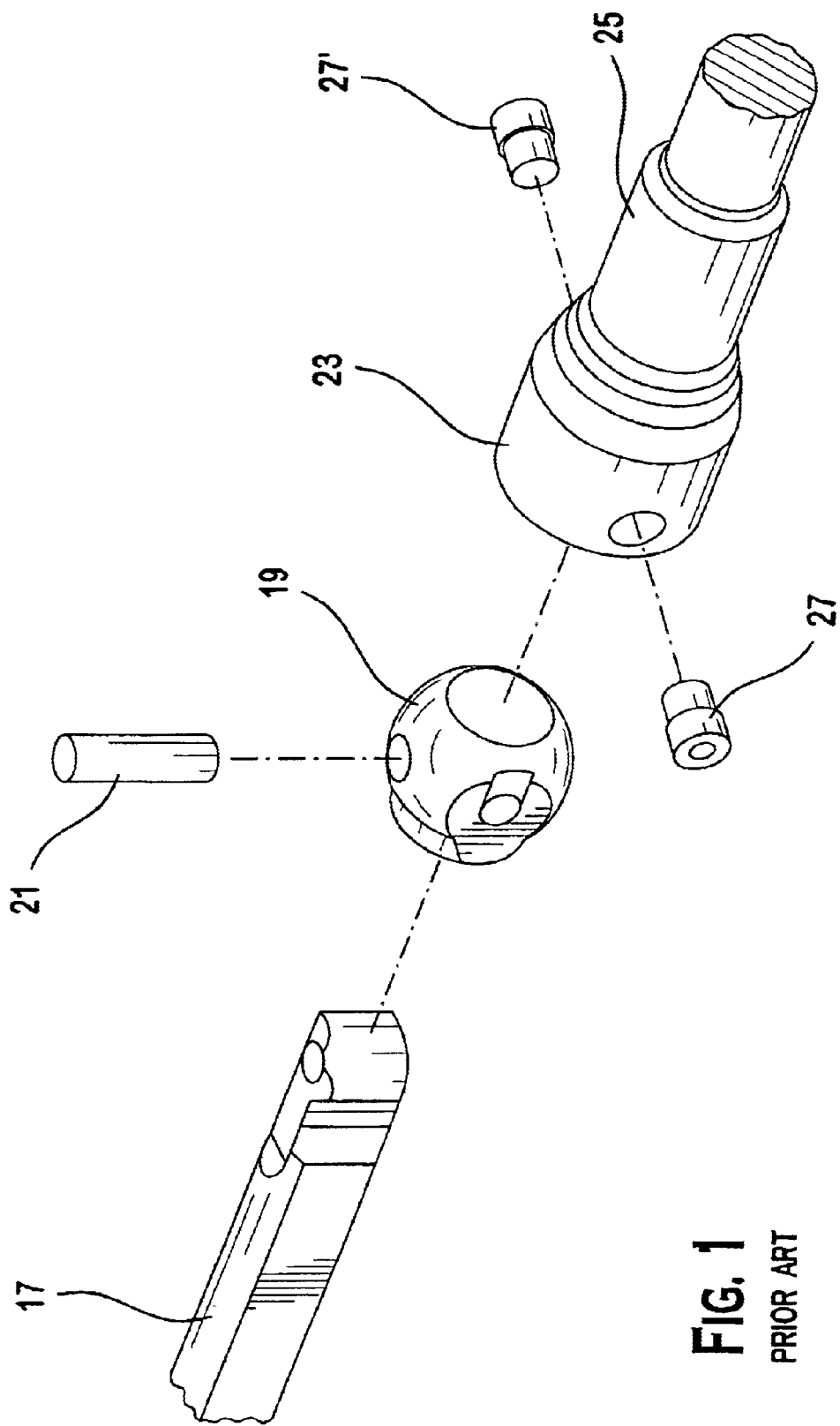
FIG. 1 is an exploded view of a prior art ball hub universal joint.
Figure 2:
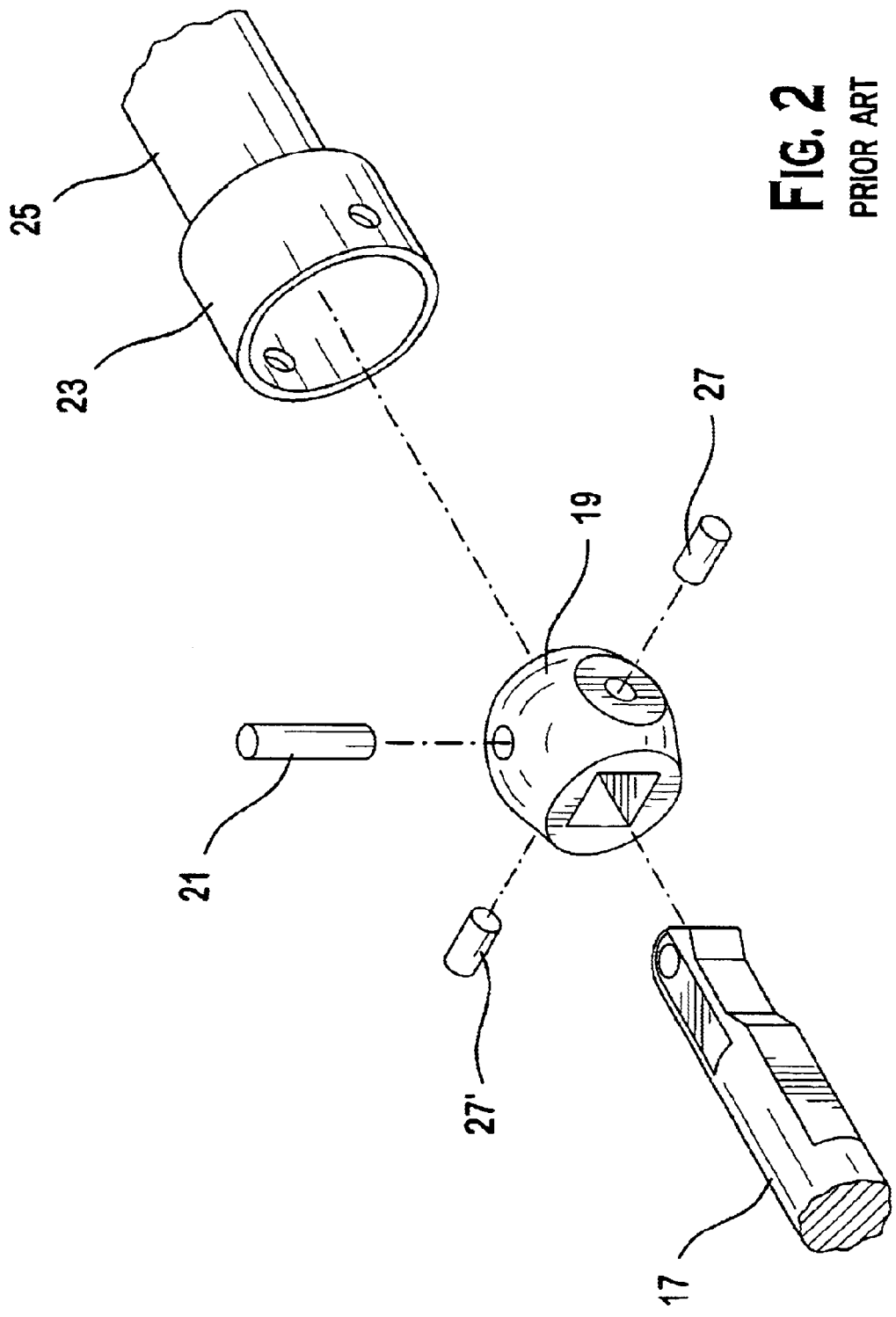
FIG. 2 is an opposing view of the prior art ball hub shown in FIG. 1.
Figure 3:
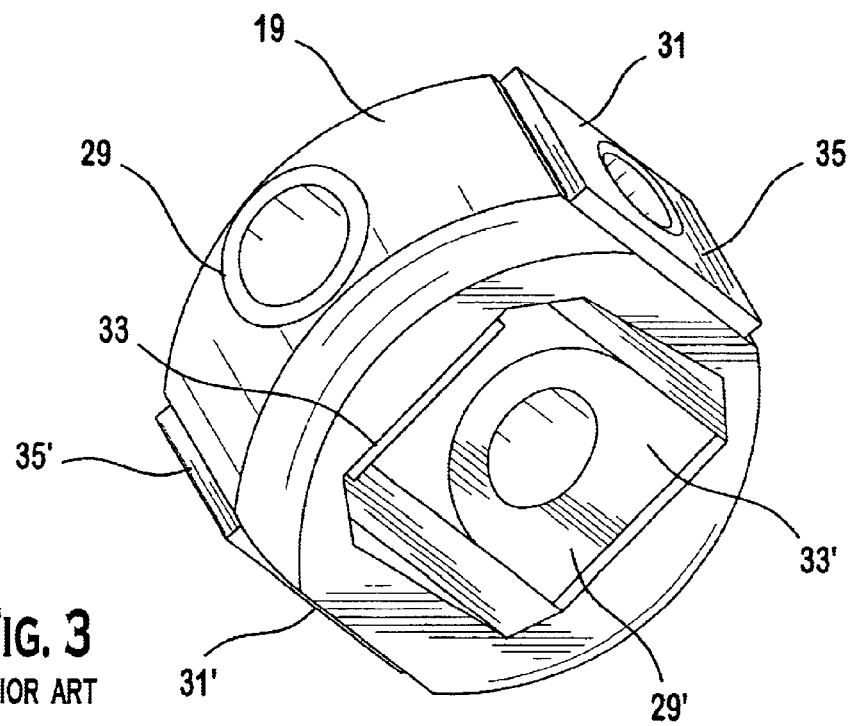
FIG. 3 is an isometric projection of the prior art ball hub shown in FIG. 1.
Figure 4:
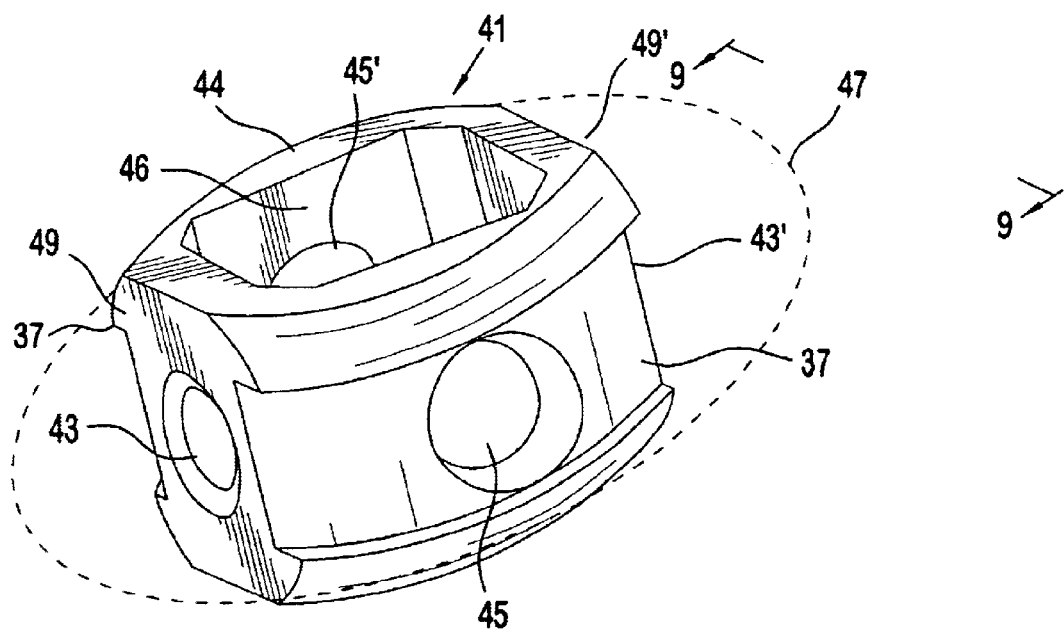
FIG. 4 is an isometric projection of an exemplary ball hub with groove in accordance with one embodiment of the invention.

In a first embodiment of the invention a hollow, spherical hub 41 is provided. A groove 37 having a predetermined depth and width is positioned on the outer surface along an equatorial plane 47 of the hub as shown in FIG. 4. A cup (not shown) of matching correspondence receives the hub 41. The invention can replace a preexisting, prior art ball hub design. The hub 41 and cup are not limited by size.

The hub 41 is a hollow, generally spherical section that can be metal, an alloy, ceramic or other material composition. The hub 41 has one or more openings 44 to the interior 46. The opening 44 and interior 46 are configured to receive the shaft 17. Four holes are provided through the hub 41 into the interior 46 for receiving the long 21 and short 27, 27' pins. Two short pin holes 43, 43' and two long pin holes 45, 45' are positioned orthogonal to each other along an equatorial plane 47, with associated pin holes sharing the same axis of rotation 180° apart. The short pin holes 43, 43' are located on exterior flats 49, 49', and the long pin holes 45, 45' are positioned in the groove 37.

Each hole 43, 43', 45, 45' receives a self-lubricating bushing 51, 53, as shown in FIGS. 5–8, that extends from the ball hub 41 exterior surface to the interior surface. To minimize clearance between the ball hub 41 pin hole 43, 43', 45, 45' diameters and the outer diameter of the: bushings 51, 53, the inner diameter for all bushings 51, 53 are molded smaller than the long 21 and short pin 27, 27' outer diameters to create an interference fit between the outer diameter of the pins 21, 27, 27' and the inner diameter of the bushings 51, 53. Stress-relieving slots 55 are molded into the bushings along the axial length of the bushing 51, 53 and radially, on an associated flange surface 33, 33', 35, 35' having a predetermined surface area and configuration, in a substantially vertical axis alignment, thereby providing a slot running the length of the bushing to the edge of the flange surface. The flange surfaces can be of any configuration and thickness. The slots 55 have a predetermined depth and width depending upon the long 21 and short 27, 27' pin dimensions (O.D. and length) and the desired thickness of the bushing $$\left(\frac{O.D.-I.D.}{2}\right).$$

The rotational load placed on the long 21 and short pins 27,27', and bushings 51, 53 is confined to the equatorial plane 47. Positioning the stress relieving slots 55 in the vertical axis effectively removes the slot 55 from any load. The stress relieving slot 55 can be located on the inner diameter of a bushing 55 and outer surface of the associated flange surface 33, 35 as shown in FIGS. 5 and 6, or, on the outer diameter and inner surface of the flange 33, 35 as shown in FIGS. 7 and 8. The stress relieving slots 55 allow each bushing 51, 53 to expand, filling the clearance between the bushings and ball hub 41 as described below.

Figure 9:
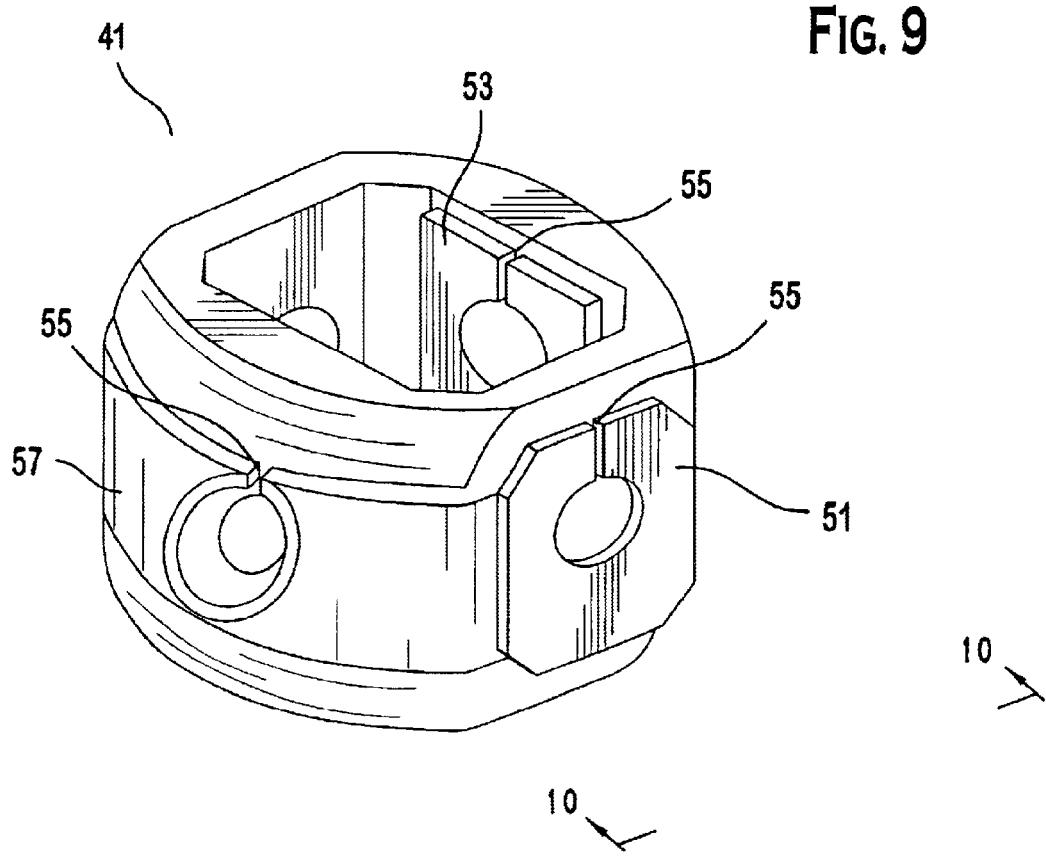
FIG. 9 is a view along line 9—9 in FIG. 4 with bushings and circumferential band.
Figure 10:
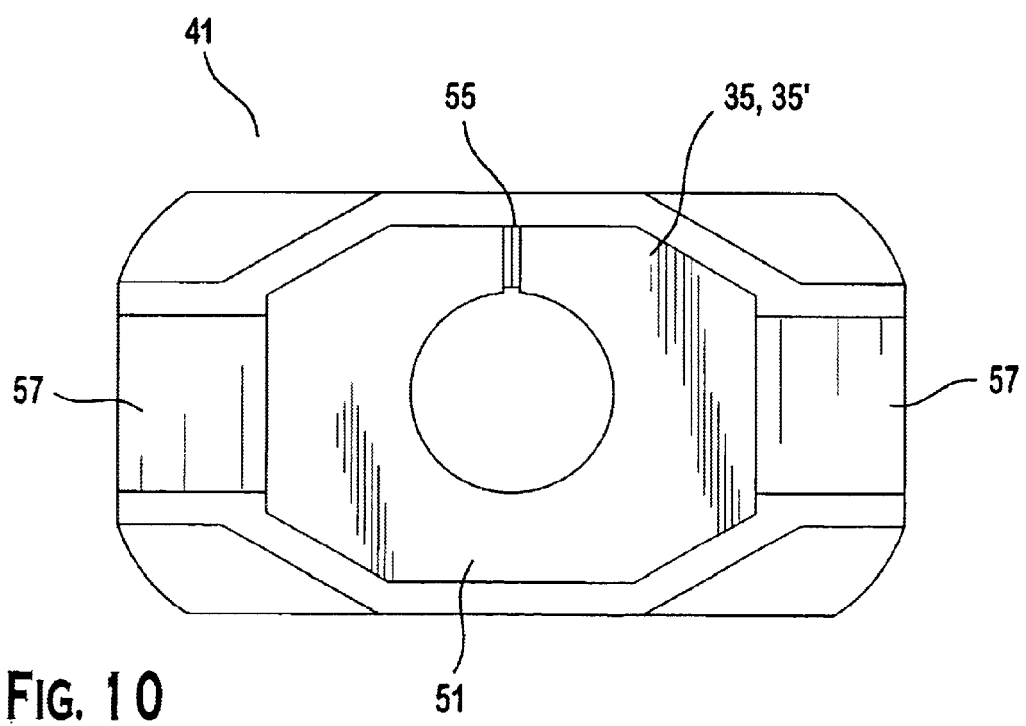
FIG. 10 is a view along line 10—10 in FIG. 9.

Referring to FIG. 9, a circumferential band 57 of a compatible material or the same material comprising the bushings 51, 53 is applied in the groove 37, by molding or other means, coupling together the four bushings 51, 53 as one assembly and forming a continuous ring around the circumference, or equatorial plane 47 of the ball hub 41. Since the circumferential area of the band 57 is greater than that of the exposed, exterior bushing 51, 53 areas, contraction or shrinkage of the band 57 after application exceeds the strength of the stress relieving slots 55 causing them to either partially or completely fracture, and thereby open as shown in FIGS. 9 and 10 with the bushing 51, 53 embodiments shown in FIGS. 5 and 6. Once the slots 55 fracture by the circumferential band 57 contraction, the inner diameter of each bushing 51, 53 is increased thereby allowing the pins 21, 27, 27' to be inserted without shaving the bushing 51, 53. If a portion of a bushing 51, 53 stress-relieving slot 55 did not fracture during circumferential band 57 contraction, pin insertion competes fracturing, reducing clearance between the ball hub, bushing and pin resulting in reduced lash.

The circumferential band 57 additionally prohibits each bushing 51, 53 from rotating eliminating torque to rotate and articulation issues. Additionally, the machining of the circumferential groove 37 around the ball hub 41 reduces the wall thickness in the areas where the long pin 21 holes are located, allowing the holes 45, 45' to be punched rather than drilled.

Figure 11:
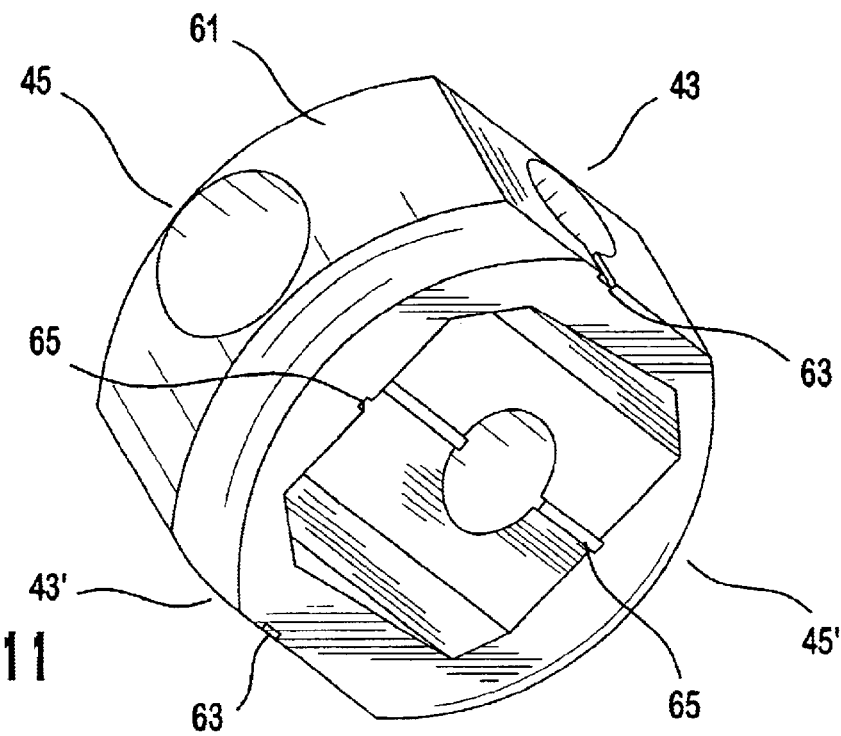
FIG. 11 is an isometric projection of an exemplary ball hub in accordance with another embodiment of the invention.
Figure 12:
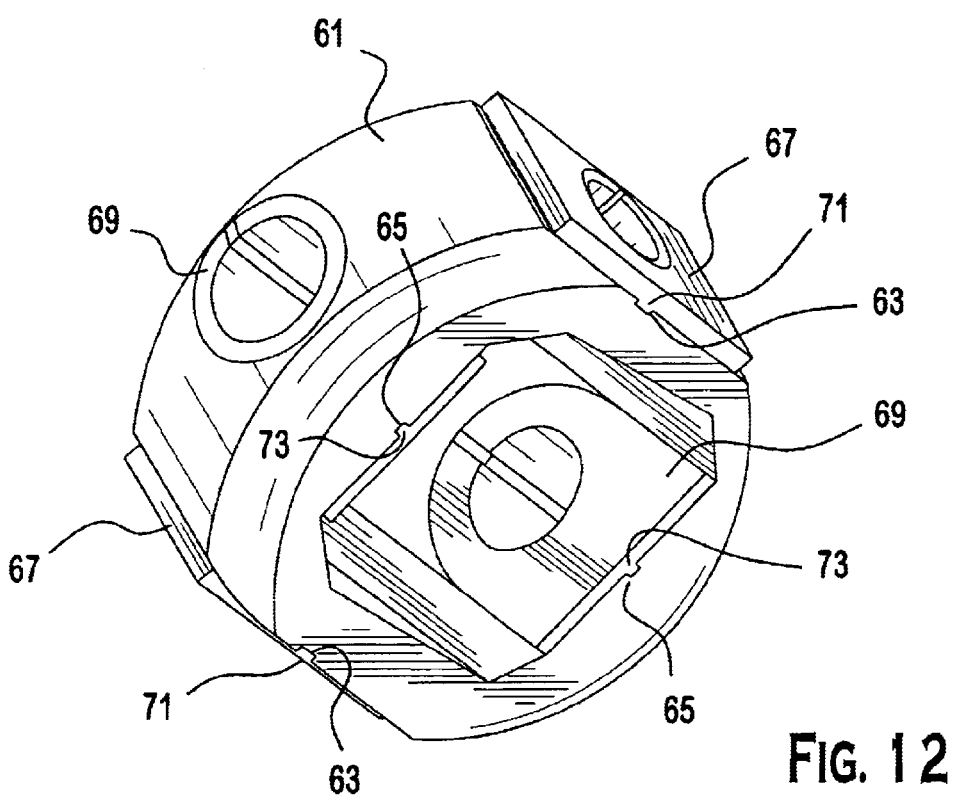
FIG. 12 is a view along line 12—12 in FIG. 11 with bushings.

Another embodiment of the invention is shown in FIGS. 11 and 12. In this embodiment, a groove 65 having a predetermined depth, length and cross-section is broached along the interior flats of the ball hub 61 radial to the long pin 21 holes on the long pin axis. On the exterior flats of the ball hub 61, a groove 63 having a predetermined depth, length and cross-section is broached radial to the short pin 27, 27' holes on the short pin axis. The groove 63, 65 cross-section can be rectangular, dovetail or others. The groove 63, 65 can be at any angle with respect to the axis of rotation and length. Bushings 67, 69, similar to those shown in FIGS. 5 through 8 but having keys 71, 73 in matching correspondence with the broached grooves 63, 65 are inserted in the long 45, 45' and short 43, 43' pin holes. The grooves and mating key on the flange areas of the bushings provide a bushing anti-rotation feature. A radius on the insertion end of the long 21 and short 27, 27' pins minimize bush shaving during pin insertion.

While the various embodiments of the hub discuss the application of bushings, bushings having associated flange surfaces, and a circumferential band, these appliances can be assembled as separate pieces constituting one assembly, or as one homogeneous molding. Various molding and assembly techniques can be employed to achieve the same result.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A universal joint comprising:
   a generally spherical body having two flat areas on opposing exterior sides and at least one opening into an open body interior;
   two flat areas on opposing interior surfaces of said body, said interior flat areas orthogonal to said exterior flat areas;
   an exterior circumferential groove extending between said exterior flat areas, said circumferential groove disposed on a given plane;
   four apertures extending into said body, said apertures positioned orthogonal to each other on said given plane, each said aperture disposed in one of said flat areas;
   a bushing disposed in each said aperture, each said bushing having a face exposed to said exterior surface and having a stress relieving slot disposed axially in each said bushing.

2. The hub according to claim 1 wherein each bushing further comprises:
   a flange configured to extend along a respective one of said interior or said exterior flat areas.

3. The hub according to claim 2 further comprising:
   a stress relieving slot disposed on each said flange, said stress relieving slot coupled to said bushing stress relieving slot.

4. A universal joint comprising:
   a generally spherical body having two flat areas on opposing exterior sides and at least one, opening into an open body interior;
   two flat areas on opposing interior surfaces of said body, said interior flat areas orthogonal to said exterior flat areas;
   a groove disposed on each said interior and exterior flat area; and
   four apertures extending into said body, said apertures positioned orthogonal to each other on said given plane, each said aperture disposed in one of said flat areas
   a bushing disposed in each said aperture, each said bushing having a face exposed to a corresponding interior or exterior flat surface; and
   a flange configured to extend along a respective one of said interior or said exterior flat areas coupled to a respective bushing, each said flange having a key in matching correspondence with said flat area groove whereby said flange keys engage said flat area grooves preventing said flanges from rotating.

5. The hub according to claim 4 further comprising:
   a stress relieving slot disposed axially in each said bushing.

6. The hub according to claim 5 further comprising:
   a stress relieving slot disposed on each said flange, said stress relieving slot coupled to said bushing stress relieving slot.

7. A method of making a universal hub, the method comprising:
   forming a generally spherical body having two flat areas on opposing exterior sides and at least one opening into an open body interior;
   forming two flat areas on opposing interior surfaces of said body, said interior flat areas orthogonal to said exterior flat areas;
   forming an exterior circumferential groove extending between said exterior flat areas, said circumferential groove disposed on a given plane:
   creating four apertures extending into said body, said apertures positioned orthogonal to each other on said given plane, each said aperture disposed in one of said flat areas;
   disposing a bushing in each said aperture, each said bushing having a face exposed to said exterior surface; and
   disposing a stress relieving slot axially in each said bushing.

8. The method according to claim 7 further comprising:
   configuring a flange to extend along a respective one of said interior or said exterior flat areas.

9. The method according to claim 8 further comprising:
   disposing a stress relieving slot on each said flange, said stress relieving slot coupled to said bushing stress relieving slot.

10. A method of making a universal hub, the method comprising:
    forming a generally spherical body having two flat areas on opposing exterior sides and at least one opening into an open body interior;
    forming two flat areas on opposing interior surfaces of said body, said interior flat areas orthogonal to said exterior flat areas;
    forming an exterior circumferential groove extending between said exterior flat areas, said circumferential groove disposed on a given plane;
    creating four apertures extending into said body, said apertures positioned orthogonal to each other on said given plane, each said aperture disposed in one of said flat areas;
    disposing a bushing in each said aperture, each said bushing having a face exposed to said exterior surface; and
    disposing a circumferential band in said circumferential groove coupling the four bushings together.

11. A universal joint hub comprising:
    a generally spherical body having two flat areas on opposing exterior sides and at least one opening into an open body interior;
    two flat areas on opposing interior surfaces of said body, said interior flat areas orthogonal to said exterior flat areas;

an exterior circumferential groove extending between said exterior flat areas, said circumferential groove disposed on a given plane;

four apertures extending into said body, said apertures positioned orthogonal to each other on said given plane, each said aperture disposed in one of said flat areas;

a bushing disposed in each said aperture, each said bushing having a face exposed to said exterior surface; and a circumferential band disposed in said circumferential groove coupling the four bushings together.

12. The hub according to claim 11 wherein the bushings and the circumferential band are manufactured from complementary materials.

13. The hub according to claim 11 wherein the bushings and the circumferential band are manufactured from the same material.

* * * * *